(12) United States Patent
Sonzogni

(10) Patent No.: US 7,404,064 B2
(45) Date of Patent: Jul. 22, 2008

(54) METHOD AND DEVICE FOR CALCULATING ADDRESSES OF A SEGMENTED PROGRAM MEMORY

(75) Inventor: Jacques Sonzogni, Fuveau (FR)

(73) Assignee: STMicroelectronics S.A., Montrouge (FR)

( * ) Notice: Subject to any disclaimer, the term of this patent is extended or adjusted under 35 U.S.C. 154(b) by 117 days.

(21) Appl. No.: 11/101,355

(22) Filed: Apr. 7, 2005

(65) Prior Publication Data

US 2005/0228965 A1 Oct. 13, 2005

(30) Foreign Application Priority Data

Apr. 7, 2004 (FR) .................................. 04 50704

(51) Int. Cl.
*G06F 12/08* (2006.01)
*G06F 12/00* (2006.01)
(52) U.S. Cl. .................... 711/203; 711/200; 711/202; 711/206
(58) Field of Classification Search .................. 711/203
See application file for complete search history.

(56) References Cited

U.S. PATENT DOCUMENTS

| | | | | |
|---|---|---|---|---|
| 3,854,126 A | * | 12/1974 | Gray et al. ................... 711/2 |
| 5,321,836 A | * | 6/1994 | Crawford et al. .......... 711/206 |
| 5,341,484 A | * | 8/1994 | Tanaka et al. .............. 718/100 |
| 5,349,651 A | * | 9/1994 | Hetherington et al. ...... 711/207 |
| 5,408,626 A | * | 4/1995 | Dixit ........................... 711/220 |
| 5,418,956 A | * | 5/1995 | Willman ...................... 711/206 |
| 5,481,684 A | * | 1/1996 | Richter et al. ............... 712/212 |
| 5,596,735 A | * | 1/1997 | Hervin et al. ............... 712/239 |
| 5,787,493 A | * | 7/1998 | Niijima et al. .............. 711/204 |
| 2001/0020264 A1 | * | 9/2001 | Belgard ....................... 711/206 |

OTHER PUBLICATIONS

B. Dally, U. Kapasi, M. Erez, B. Serebrin, T. Knight, J. Ahn, SSS Strawman Architecture, version. 61., Apr. 18, 2002, pp. 5-12. http://web.archive.org/web/20021206152328/graphics.stanford.edu/sss/.*
Tanenbaum, S., *A Method for Implementing Paged, Segmented Virtual Memories on Microprogrammable Computers*, Operating Systems Review USA, vol. 13, No. 2, 1979, pp. 26-32, XP002305693.
Musoll, e., et al., *Working-Zone Encoding for Reducing the Energy in Microprocessor Address Buses*, IEEE Trans on Very Large Scale Integration (VLDI) Systems IEEE Inc. New York, US, vol. 6, No. 4, Dec. 1998, pp. 568-572, XP000831143.

(Continued)

*Primary Examiner*—Donald Sparks
*Assistant Examiner*—Alan M Otto
(74) *Attorney, Agent, or Firm*—Lisa K. Jorgenson; James H. Morris; Wolf, Greenfield & Sacks, P.C.

(57) ABSTRACT

A method and a device for converting a virtual address of a program executed by a processor and provided by a program counter into a physical address in a program memory, the program having been stored in the memory in at least one segment of consecutive addresses. The method includes adding to each address provided by the program counter a number corresponding to the offset between the memory address and the virtual address provided by the program counter, and detecting a possible overflow from the current segment by comparing the obtained physical address with the start and end addresses of the considered segment.

13 Claims, 1 Drawing Sheet

OTHER PUBLICATIONS

Benini, L. et al., *Layout-Driven Memory Synthesis for embedded systems-on-Chip*, IEEE Trans on Very Large Scale Integration (VLDI) Systems IEEE USA, vol. 10, No. 2, Apr. 2002, pp. 96-105, XP002305694.

Grant, D. et al., *Synthesis of Address Generators*, International Conf. on Computer Aided Design, Santa Clara, Nov. 5, 1989, vol., Conf. 7, pp. 116-119.

Wei-Chung Cheng et al., *Memory Bus Encoding for Low Power, a Tutorial*, International Symposium on Quality Electronic Design 200, Mar. 26, 2001, pp. 199-204, XP01053842.

Panda, P.R. et al., *ACM Transactions on Design Automation of Electronic Systems ACM USA*, vol. 6, No. 2 Apr. 2001, pp. 149-206, XP002305695.

\* cited by examiner

METHOD AND DEVICE FOR CALCULATING ADDRESSES OF A SEGMENTED PROGRAM MEMORY

BACKGROUND OF THE INVENTION

1. Field of the Invention

The present invention generally relates to the management of a program memory, that is, of a memory in which are stored applications containing instructions or opcodes to be executed by a processor, as opposed to a so-called data memory in which the variable data processed by a program are stored. Such a program memory generally is a non-volatile memory, possibly reprogrammable, storing program lines.

2. Discussion of the Related Art

An example of application of the present invention relates to JAVA applications intended to be processed within smart cards, that is, devices having a relatively reduced memory space, requiring segmentation of the memory to enable dynamic storage of the different applications.

More generally, the present invention applies to the management of program memory spaces in which the stored applications are to be stored at discontinuous addresses according to the space remaining available in the program memory.

Conventionally, upon initial storage of a program in a program memory, the processor associated with this memory loads the application into available areas or segments. The processor then also stores an address correspondence table enabling it to subsequently find back the instruction lines to be executed.

FIG. 1 shows a conventional example of a memory management unit (MMU) 1 generally used as an interface between a central processing unit 2 (UC) processing data from programs stored in a program memory 3 (MEM). The function of the interface is to convert a virtual address VIRTADD provided by central processor 2 into a physical address PHYSADD designating the memory line in which the desired instruction is stored in memory 3. Such a conversion is indispensable for instruction lines INST of the program to be able to transit from the memory to the central processor to be executed.

Upon installation of the program, that is, initial storage thereof in memory 3, central processor 2 generates an address-conversion table 12 keeping the correspondence between virtual addresses (successive program lines) and physical addresses of storage in memory 3 according to the available space therein and especially to the available segments. Afterwards, each time central processor 2 needs loading an instruction for execution thereof, it communicates the virtual address to interface 1 in charge of converting it into a physical address. In practice, to avoid slowing down the program execution, interface 1 requires a cache memory space 13 (CACHE) in which are temporarily stored the instructions between memory 3 and central processor 2. This cache memory is especially used to limit the extractions and conversions by avoiding extracting an instruction from memory 3 from the moment that it is available in the cache memory. A translation look-aside buffer 11 (TLB) then indicates to table 12 whether a segment is or not present in memory 13.

The memory management unit solution discussed in relation with FIG. 1 thus requires use of a cache memory. It is thereby incompatible with an application to integrated devices of limited size, especially of smart card type.

Further, the necessary address-to-address conversion devices and correspondence tables are particularly bulky.

The article "A Method L'article "A Method for Implementing Paged, Segmented Virtual Memories on Microprogrammable Computers" from Anderw S Tanenbaum, edited in 1979 in Operating Systems Review USA, vol. 13, no. 2, pages 26-32 (XP-002305693) discloses a method for converting an address of a program counter into an address in an external segmented memory. The change from a segment to another requires modifying the value of the program counter. Further, the detection of the segment boundaries depends on the information contained in the searched addresses.

SUMMARY OF THE INVENTION

The present invention aims at providing a novel method and device for converting a virtual address of a program into a physical address of a memory containing the corresponding instruction, which overcomes the disadvantages of known solutions.

The present invention especially aims at providing a solution that can be implemented in integrated circuits of small size and especially in smart cards.

The present invention also aims at providing a solution which does not require use of a cache memory between the program memory and the central processor.

To achieve these and other objects, the present invention provides a method for converting a virtual address of a program executed by a processor and provided by a program counter into a physical address in a program memory, the program having been stored in the memory in at least one segment of consecutive addresses, comprising: adding to each address provided by the program counter a number corresponding to the offset between the memory address and the virtual address provided by the program counter; and detecting a possible overflow from the current segment by comparing, regardless of the addressed content, the obtained physical address with the start and end addresses of the considered segment.

According to an embodiment of the present invention, a table comprising the number of segments as well as the start and end addresses of each of the segments is stored, preferably, in a non-volatile memory.

According to an embodiment of the present invention, said table is established upon initial loading of the program into the memory.

According to an embodiment of the present invention, the offset to be applied to the addresses provided by the program counter and the start and end addresses of the current segment are updated by the processor on each change of memory segment in the external memory.

The present invention also provides a device for converting a virtual address provided by a program counter of a processor into a physical address of an instruction line in at least one segment of consecutive addresses of a memory, comprising: three registers respectively containing an offset to be applied to the virtual address, the physical start address of a current segment in the memory, and the end address of the current segment; means for adding to the address provided by the program counter the number contained in the first register, without modifying the value of said counter; and means for comparing the generated address with the respective addresses contained in the second and third registers to detect a possible overflow from the current segment.

According to an embodiment of the present invention, the three registers are updated by the processor at each change of memory segment in the external memory.

The foregoing and other objects, features, and advantages of the present invention will be discussed in detail in the following non-limiting description of specific embodiments in connection with the accompanying drawings.

DETAILED DESCRIPTION

Figure 1:
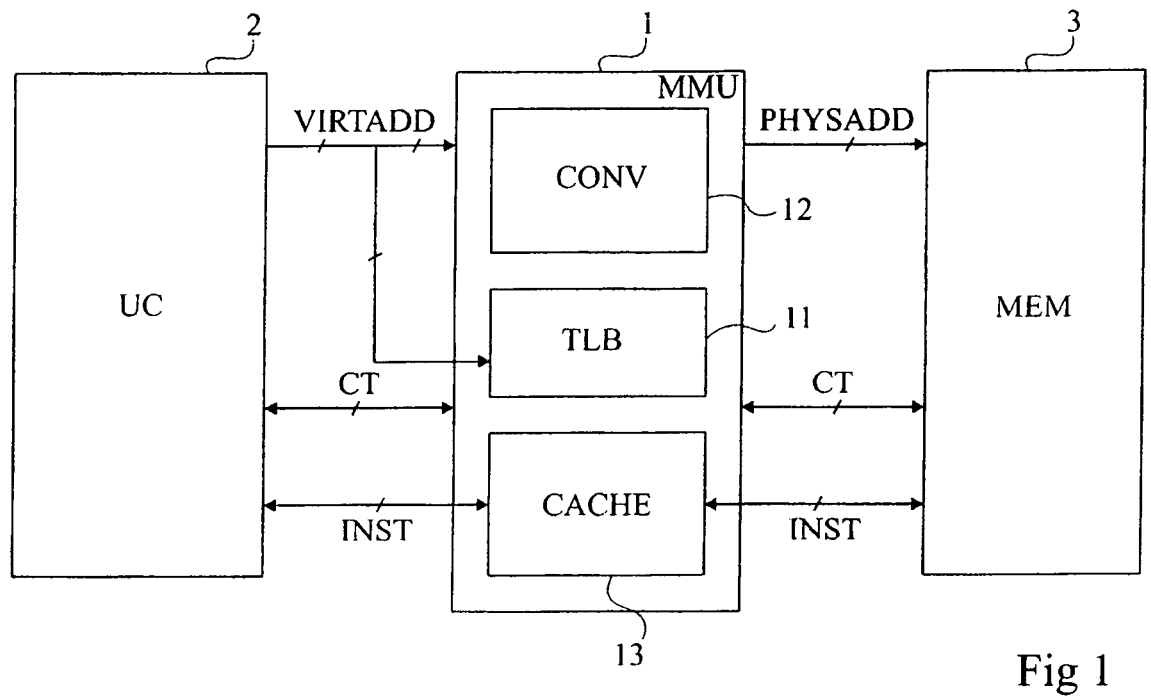
FIG. 1, previously described, is intended to show the state of the art and the problem to solve.

The same elements have been designated with the same reference numerals in the different drawings. For clarity, only those elements which are necessary to the understanding of the present invention have been shown in the drawings and will be described hereafter. In particular, the present invention is compatible with all conventional program memories. Further, on the central processor side, the management of the virtual addresses and the use by the microprocessor of the instructions extracted from the memory have not been described in detail.

A feature of the present invention is to manage the address difference between a virtual and physical address by means of an offset or address shift increment. The present invention takes, for this purpose, advantage from the fact that, in a same segment of the physical memory, instructions which are contiguous as to their virtual addresses are also contiguous as to their physical addresses. Accordingly, within a same memory segment, successive instructions as to their virtual addresses can be easily found by updating of the program counter of the central processor.

To be able to calculate the offset and manage different segments of the physical memory in which the program is stored, the present invention preferably provides storing the physical start and end addresses of each of the memory segments. This storage is performed on installation of the program in the system, and thus at its initial storage. Afterwards, the start and end addresses in the external memory remain unmodified. As an alternative, only the start or end address is stored, along with the segment size.

Thus, according to the present invention, a physical address of an instruction line in a memory containing a program can be calculated by adding, to the virtual address provided by the program counter of the central processor, the shift or offset assigned to the corresponding segment in the memory. This offset especially depends on the type of stored program code and on the method according to which the memory segmentation of the program has been carried out, as will be seen hereafter.

The implementation of the present invention requires, in the illustrated embodiment, three registers within the central processor to store, respectively, the start address, the end address of the involved segment, and the offset assigned to this segment.

The physical addresses corresponding to the different segments are stored in a non-volatile memory of the product which will be read from by the central processor on each updating.

Figure 2:
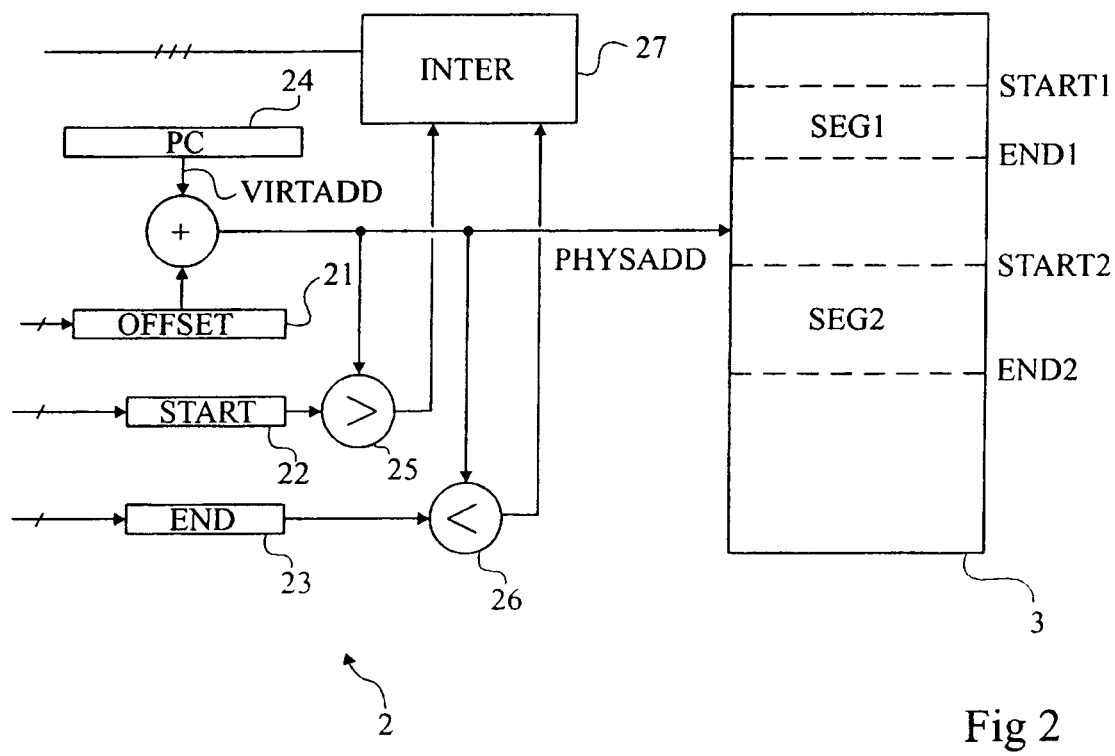
FIG. 2 very schematically illustrates in the form of blocks an embodiment of the present invention.

In FIG. 2, it is assumed that a program must be stored in memory 3 and requires two separate segments SEG1 and SEG2 having respective start and end physical addresses START1, END1, and START2, END2.

Upon loading of the program into memory 3, central processor 2 and the memory loading management software keep in a program definition table the number of segments, the identifier of the first segment to be processed on execution of the program, the respective start and end addresses of the different segments.

Before activation of the program by the operating system or the interpreting software, that is, before execution of the program, registers 21 (OFFSET), 22 (START), and 23 (END) dedicated to the implementation of this embodiment of the present invention are positioned according to the definition of the first segment to be executed. This positioning is performed based on the information contained in the definition table of central processor 2.

When the application is activated by the operating system or the interpreting software, physical address PHYSADD is generated as corresponding to the value provided by program counter 24 (PC), that is, providing virtual address VIRTADD, to which is added the offset contained in register 21. The generated physical address is, in parallel, compared with limits START1 and END1 by comparators 25 and 26 (hardware) of central processor 2 to detect the need to pass on to the second segment of memory 3. As soon as one of comparators 25 or 26 detects a coming out of segment 1, an interrupt is generated and the operating system and/or the interpreting software (symbolized by a block 27, INTER) reloads registers 21, 22, and 23 with the information corresponding to the new segment aimed at according to the called address.

An advantage of the present invention is that it is not necessary to modify program counter register 24 during the program execution.

Another advantage of the present invention is that the program is not necessarily segmented in a given order. In other words, the starting of the program may be contained in the second segment while the end of the program is contained in the first segment.

In its preferred application to smart cards, the present invention takes advantage of the fact that the memory and the central processor are generally integrated together, which enables easy and fast access to the memory, requiring no cache memory.

According to a first example of implementation, adapted to a program code in so-called native language, the program is initially compiled with a definition of the addressable memory space which is associated therewith. In other words, all the links between instructions are set on compiling according to the addresses used in this compiling. According to the present invention, upon loading in free areas of the memory, the program is divided into segments, the physical start and end addresses of which are also stored. The offset between the address of each physical segment starting and the compiled address of the corresponding instruction is preferably calculated upon loading of the program into memory 3 and stored in the table. After, on each (virtual) address call by the program counter, the offset (positive or negative) associated with the physical address segment is added to the number of the program counter and, transparently for the latter, memory 3 is addressed with the correct physical address.

Another advantage of the present invention is that its implementation by hardware means enables knowing in advance the size of the program instructions, the so-called program instruction set. This is particularly advantageous in an application to JAVA programs in which the link with the addressable space is made at the last moment upon loading of the program into the memory and not upon compiling of the program specific to a given processor.

In this example of application, the address offset used by the present invention is actually zero. Indeed, the compiling address is not involved in the address calculation. At the application starting, the program counter is loaded with the physical memory address of the first instruction of the considered segment.

Of course, the present invention is likely to have various alterations, modifications, and improvements which will readily occur to those skilled in the art. In particular, the sizes to be given to the registers specific to the present invention are within the abilities of those skilled in the art based on the functional indications given hereabove. Further, although the present invention has been described in relation with an application to smart cards, it may be implemented in other systems.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for converting a virtual address of a program executed by a processor and provided by a program counter into a physical address in a program memory, the program is being stored in the memory in at least one segment of consecutive addresses, comprising: adding to the virtual address provided by the program counter a number corresponding to an offset assigned to a current segment to obtain the physical address; and comparing the obtained physical address with start and end addresses of the current segment to detect an over flow from the current segment and generate an interrupt to the processor; wherein the interrupt is generated to update by the processor the offset, the start address and the end address of the current segment with an offset, a start address and an end address of a new segment addressed by the obtained physical address.

2. The method of claim 1, wherein a table comprising a number of the at least one segment, and at least one of start and end addresses of each of the at least one segment is stored in non-volatile memory.

3. The method of claim 2, wherein said table is established upon initial loading of the program into the program memory.

4. The method of claim 1, wherein the offset to be applied to the virtual addresses provided by the program counter and the start and end addresses of the current segment are updated by the processor on each change of a memory segment in the memory.

5. A device for converting a virtual address provided by a program counter of a processor into a physical address of an instruction line in at least one segment of consecutive addresses of a memory, comprising: three registers respectively containing an offset to be applied to the virtual address, a physical start address of a current segment in the memory, and a physical end address of the current segment; means for adding to the virtual address provided by the program counter the offset contained in the first register to generate the physical address, without modifying the value of said program counter; and means for comparing the generated physical address with the respective addresses contained in the second and third registers to detect an overflow from the current segment and generate an interrupt to the processor; wherein, upon generating the interrupt, the three registers respectively containing the offset, the physical start address and the physical end address of the current segment are reloaded respectively with an offset, a physical start address and a physical end address of a new segment addressed by the obtained physical address.

6. The device of claim 5, wherein the three registers are updated by the processor at each change of a memory segment in the memory.

7. The method of claim 1, wherein a table comprising a number of the at least one segment, the start address and a size of each of the at least one segment is stored in a non-volatile memory.

8. The method of claim 1, wherein the program is being stored in the memory in a plurality of segments that are not consecutive.

9. The method of claim 1, wherein a size of instructions of the program is known in advance.

10. The method of claim 2, wherein the table further comprises an offset assigned to the at least one segment.

11. The method of claim 7, wherein the table further comprises an offset assigned to the at least one segment.

12. The device of claim 5, wherein a table comprising a number of the at least one segment and the physical start and end addresses of each of the at least one segment is stored in non-volatile memory.

13. The device of claim 12, wherein the table further comprises an offset assigned to the at least one segment.

* * * * *

UNITED STATES PATENT AND TRADEMARK OFFICE
CERTIFICATE OF CORRECTION

PATENT NO. : 7,404,064 B2  Page 1 of 1
APPLICATION NO. : 11/101355
DATED : July 22, 2008
INVENTOR(S) : Jacques Sonzogni It is certified that error appears in the above-identified patent and that said Letters Patent is hereby corrected as shown below:

Claim 12, col. 6, line 41 should read:
a non-volative memory.

Signed and Sealed this

Sixteenth Day of September, 2008

JON W. DUDAS
*Director of the United States Patent and Trademark Office*